(12) United States Patent
Uesugi

(10) Patent No.: US 11,434,818 B2
(45) Date of Patent: Sep. 6, 2022

(54) VARIABLE NOZZLE UNIT

(71) Applicant: KABUSHIKI KAISHA TOYOTA JIDOSHOKKI, Aichi-ken (JP)

(72) Inventor: Tsuyoshi Uesugi, Aichi-ken (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 0 days.

(21) Appl. No.: 17/426,383

(22) PCT Filed: Jan. 16, 2020

(86) PCT No.: PCT/JP2020/001212
§ 371 (c)(1),
(2) Date: Jul. 28, 2021

(87) PCT Pub. No.: WO2020/158406
PCT Pub. Date: Aug. 6, 2020

(65) Prior Publication Data
US 2022/0162960 A1    May 26, 2022

(30) Foreign Application Priority Data
Jan. 31, 2019  (JP) .............................. JP2019-015120

(51) Int. Cl.
*F02C 6/12* (2006.01)
*F02B 37/24* (2006.01)

(52) U.S. Cl.
CPC .............. *F02C 6/12* (2013.01); *F02B 37/24* (2013.01)

(58) Field of Classification Search
CPC ...... F01D 17/165; F02C 6/12; F05D 2220/40; F05D 2230/50; Y02T 10/12; F02B 37/24
See application file for complete search history.

(56) References Cited

U.S. PATENT DOCUMENTS

2013/0180106 A1* 7/2013 Ramb ............... F02B 37/24
29/888.024

FOREIGN PATENT DOCUMENTS

JP   2010-180864 A   8/2010

OTHER PUBLICATIONS

International Search Report issued in International Patent Application No. PCT/JP2020/001212, dated Feb. 18, 2020 (and English translation thereof).

* cited by examiner

*Primary Examiner* — Audrey B. Walter
*Assistant Examiner* — Edward Bushard
(74) *Attorney, Agent, or Firm* — Greenblum & Bernstein, P.L.C.

(57) ABSTRACT

A variable nozzle unit includes a first plate, a second plate, a plurality of nozzle vanes each having a rotary shaft portion and a vane, a plurality of vane arms, and a unison ring. Each vane arm includes an engaging portion. The plurality of vane arms includes at least one extension arm. The extension arm includes an extension portion that has a shape extending from the engaging portion toward the second plate. The second plate has a receiving portion that receives the extension portion. The receiving portion includes a pair of contact walls, wherein the contact walls are brought into contact with the extension portion respectively at a position where each of the nozzle vanes maximizes the flow passage area of the exhaust air passage and at a position where the nozzle vane minimizes the flow passage area of the exhaust air passage.

3 Claims, 5 Drawing Sheets

VARIABLE NOZZLE UNIT

CROSS-REFERENCE TO RELATED APPLICATIONS

This application is a National Stage of International Application No. PCT/JP2020/001212 filed Jan. 16, 2020, claiming priority based on Japanese Patent Application No. 2019-015120 filed Jan. 31, 2019, the contents of both applications are incorporated herein by reference in their entirety.

TECHNICAL FIELD

The present disclosure relates to a variable nozzle unit.

BACKGROUND ART

A variable nozzle unit for varying the flow passage area of a passage through which exhaust gas flows toward a turbine wheel of a turbocharger is commonly known. For example, Japanese Patent Application Publication No. 2010-180864 (hereinafter referred to as "Patent Document 1") discloses a variable nozzle unit that includes a side plate, a main plate, a plurality of nozzle pins, a plurality of nozzle vanes, a plurality of arms, a unison ring, and a stopper. The side plate and the main plate each have an annular shape. An exhaust air passage is formed between the side plate and the main plate. The nozzle pins are held by the side plate and the main plate such that the nozzle pins are rotatable relative to the plates. Each nozzle vane is a member for varying the flow passage area of the exhaust air passage, and is fixed to its corresponding nozzle pin such that the nozzle vane rotates together with the nozzle pin around the axis of the nozzle pin. Each arm is connected to the corresponding nozzle pin outside the exhaust air passage, and rotates the nozzle pin around the axis of the nozzle pin. The inner peripheral surface of the unison ring has recesses each engaged with an end of its corresponding arm. The rotation of the unison ring causes all the arms to rotate around the respective nozzle pins at the same time. This changes the postures of the nozzle vanes, thereby varying the flow passage area of the exhaust air passage. The inner peripheral surface of the unison ring has a cutout in which the stopper is disposed. The stopper is a member that is fixed to the main plate and regulates the rotation angle of the unison ring. Specifically, the stopper comes into contact with the inner surface of the cutout at a position where each nozzle vane maximizes the flow passage area of the exhaust air passage and at a position where the nozzle vane minimizes the flow passage area of the exhaust air passage.

CITATION LIST

Patent Document

Patent Document 1: Japanese Patent Application Publication No. 2010-180864

SUMMARY OF INVENTION

Technical Problem

Such a variable nozzle unit mentioned in the Patent Document 1 needs a dedicated part (stopper) for regulating the rotation angle of the unison ring, and assembly process for assembling the dedicated part to the variable nozzle unit.

The purpose of the present disclosure is to provide a variable nozzle unit without having a dedicated part for regulating a range of a rotation angle of a unison ring.

Solution to Problem

A variable nozzle unit according to this disclosure is a variable nozzle unit for adjusting a flow passage area of an exhaust air passage of a turbocharger. The variable nozzle unit includes: a first plate having an annular shape; a second plate having an annular shape and disposed at a position facing the first plate, the second plate cooperating with the first plate to form the exhaust air passage between the first plate and the second plate; a plurality of nozzle vanes, each of the nozzle vanes having a rotary shaft portion and a vane, the rotary shaft portion being held by the first plate and the second plate such that the rotary shaft portion is rotatable relative to the first plate and the second plate, the rotary shaft portion having a protruding portion that protrudes from the second plate along a direction from the first plate toward the second plate, the vane being disposed between the first plate and the second plate and connected to the rotary shaft portion such that the vane is rotatable together with the rotary shaft portion around a central axis of the rotary shaft portion, the nozzle vane being configured to vary the flow passage area of the exhaust air passage; a plurality of vane arms, each of the vane arms being connected to the protruding portion of the corresponding rotary shaft portion, and configured to rotate the rotary shaft portion around the central axis of the rotary shaft portion; and a unison ring held by the second plate such that the unison ring is rotatable relative to the second plate and around a central axis of the second plate, the unison ring being configured to rotate the vane arms around their respective rotary shaft portions with rotation of the unison ring relative to the second plate. The unison ring includes a plurality of arm holding portions, and the arm holding portions are arranged side by side along a circumferential direction of the unison ring and each hold the corresponding vane arm. Each of the vane arms includes an engaging portion that is engaged with the arm holding portion. The plurality of vane arms includes at least one extension arm. The extension arm includes an extension portion that has a shape extending from the engaging portion toward the second plate. The second plate has a receiving portion that receives the extension portion. The receiving portion includes a contact wall that is brought into contact with the extension portion at a position where each of the nozzle vanes maximizes the flow passage area of the exhaust air passage and at a position where the nozzle vane minimizes the flow passage area of the exhaust air passage.

In this variable nozzle unit, the plurality of vane arms includes the extension arm that includes the extension portion, the second plate has the receiving portion, and the extension portion comes into contact with the contact wall of the receiving portion, so that the nozzle vane rotates between the position where the nozzle vane maximizes the flow passage area of the exhaust air passage and the position where the nozzle vane minimizes the flow passage area of the exhaust air passage to regulate the range of the rotation angle of the unison ring. This allows the variable nozzle unit to regulate the range of the rotation angle of the unison ring with the vane arms and the second plate, unlike a conventional art using a dedicated part for regulating the range of the rotation angle of the unison ring.

In the variable nozzle unit, each of the arm holding portions has a shape that is recessed inwardly from an outer periphery of the unison ring in a radial direction of the unison ring, and each of the vane arms may further include: a connecting portion that is connected to the protruding portion; and a coupling portion that is disposed outward of the unison ring in a direction in which the second plate and the unison ring are stacked on each other, wherein the coupling portion couples the connecting portion to the engaging portion. In this case, a gap is preferably formed between the coupling portion and the unison ring.

This allows reduction in a diameter of the unison ring, and prevents the occurrence of friction between the coupling portion and the unison ring, thereby suppressing inclination of the nozzle vane relative to the plates.

The engaging portion is preferably located away from the second plate.

This prevents the occurrence of friction between the engaging portion and the second plate, thereby suppressing the inclination of the nozzle vane relative to the plates reliably.

Advantageous Effects of Invention

As described above, the present disclosure can provide a variable nozzle unit without having a dedicated part for regulating a range of a rotation angle of a unison ring.

DESCRIPTION OF EMBODIMENTS

Figure 1:
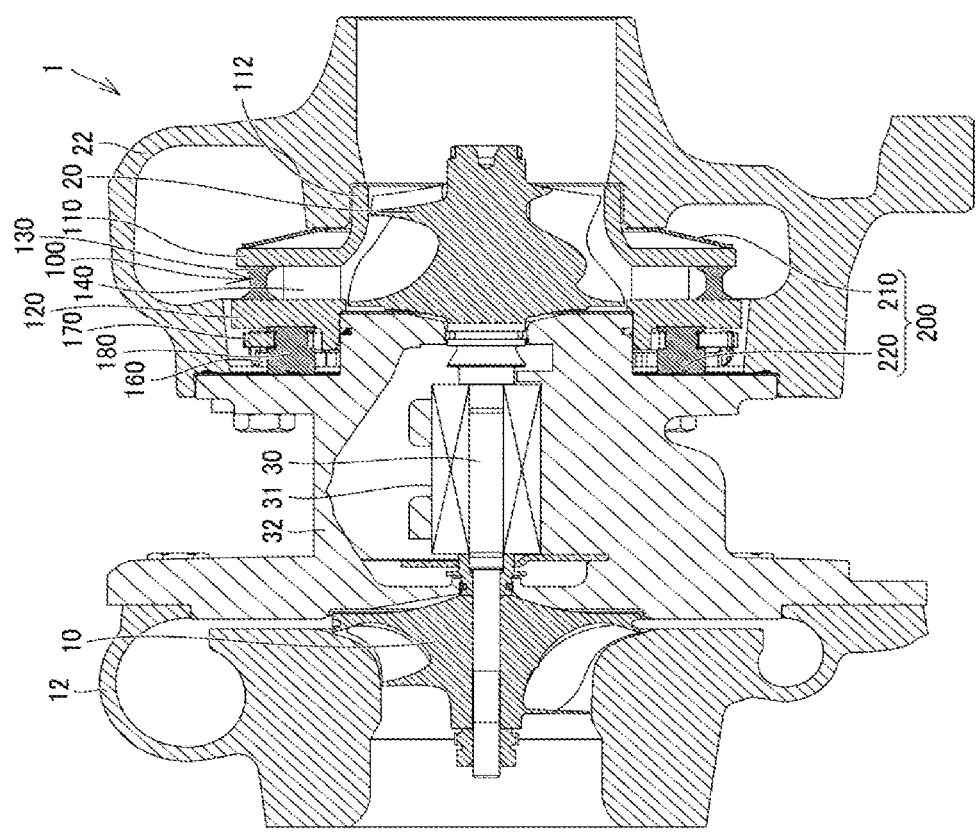
FIG. 1 is a sectional view schematically illustrating a configuration of a turbocharger that includes a variable nozzle unit of an embodiment of the present disclosure.

An embodiment of the present disclosure will be described with reference to the accompanying drawings. In the drawings referred to below, the same or corresponding members are given the same number.

FIG. 1 is a sectional view schematically illustrating a configuration of a turbocharger that includes a variable nozzle unit of an embodiment of the present disclosure. As illustrated in FIG. 1, a turbocharger 1 includes a compressor wheel 10, a compressor housing 12, a turbine wheel 20, a turbine housing 22, a shaft 30, a bearing 31, a bearing housing 32, a variable nozzle unit 100, and an urging member 200. This turbocharger 1 is mounted to a vehicle, such as an automobile.

The compressor wheel 10 compresses gas, such as the atmosphere. The compressor housing 12 accommodates the compressor wheel 10.

The turbine wheel 20 is driven to rotate by exhaust gas emitted from an engine (not illustrated). The turbine housing 22 accommodates the turbine wheel 20.

The shaft 30 connects the compressor wheel 10 to the turbine wheel 20. Accordingly, the rotational driving force of the turbine wheel 20 is transmitted to the compressor wheel 10. The bearing 31 receives the shaft 30. The bearing housing 32 accommodates the shaft 30 and the bearing 31.

The bearing housing 32 is disposed between the compressor housing 12 and the turbine housing 22.

Figure 2:
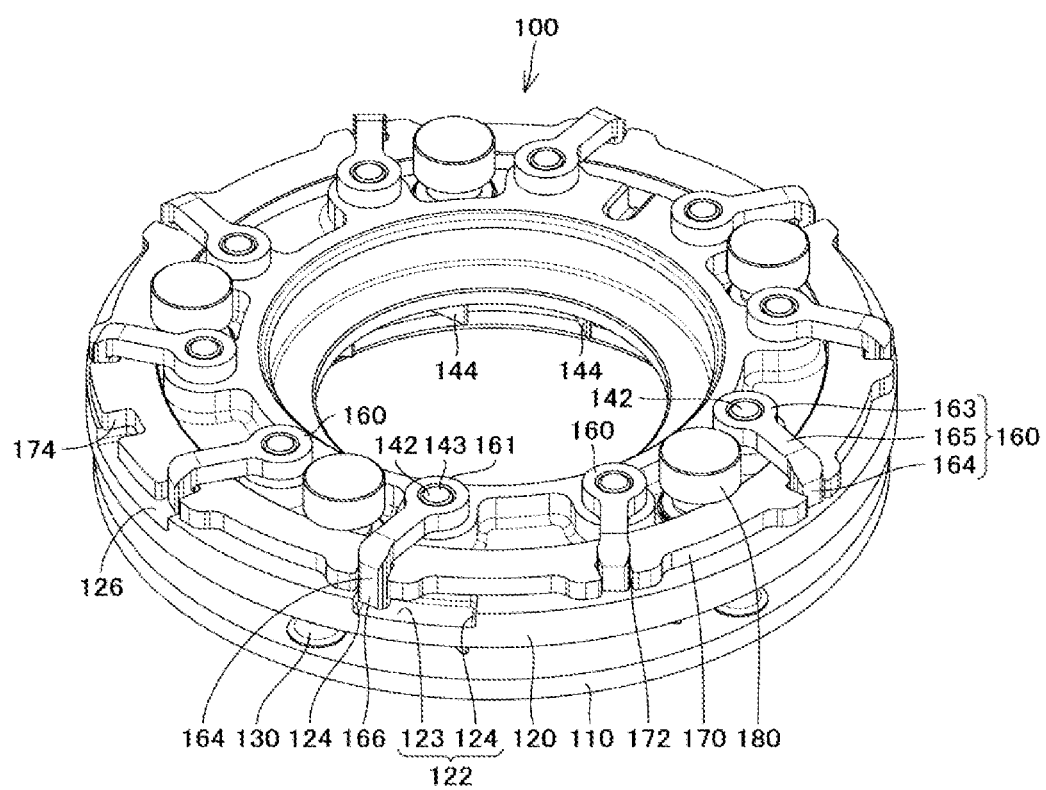
FIG. 2 is a perspective view of the variable nozzle unit illustrated in FIG. 1.
Figure 3:
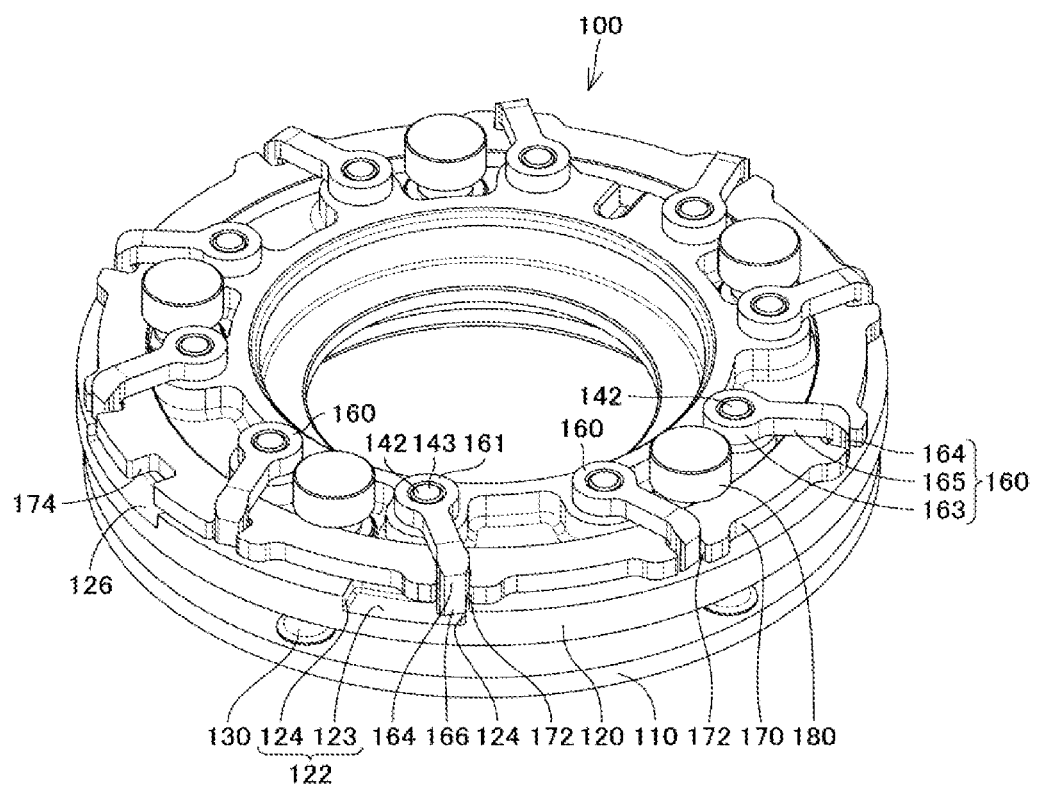
FIG. 3 is a perspective view of the variable nozzle unit illustrated in FIG. 1.
Figure 4:
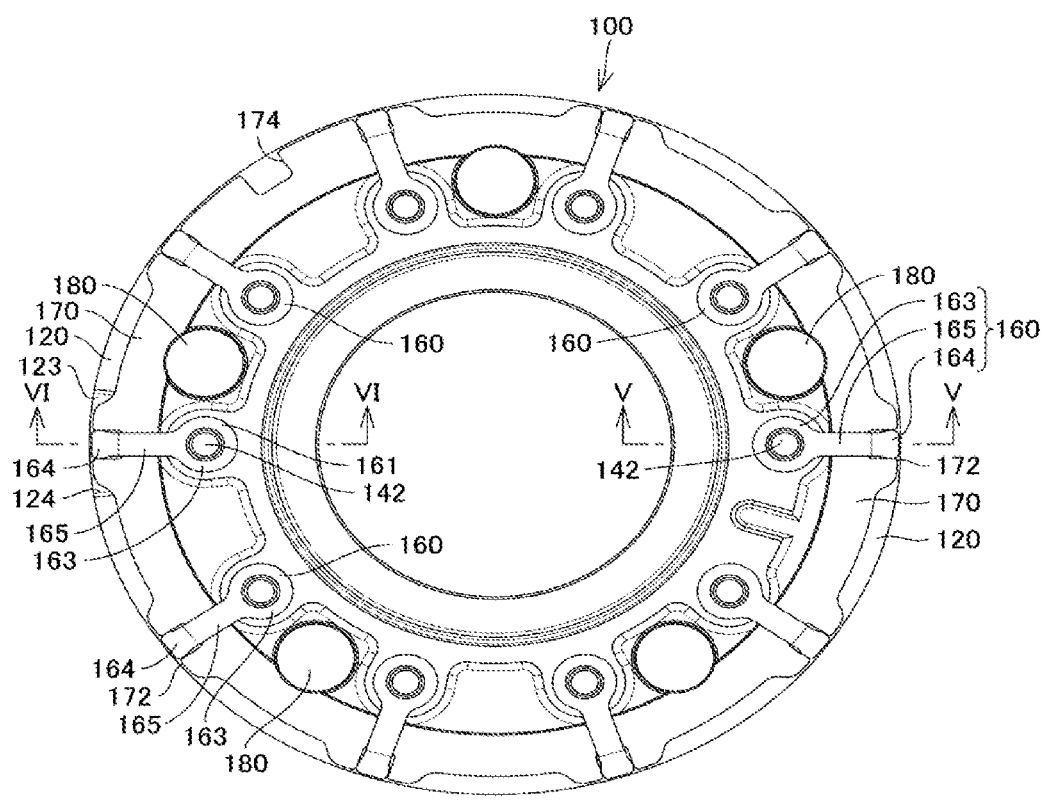
FIG. 4 is a plan view of the variable nozzle unit illustrated in FIG. 1.
Figure 5:
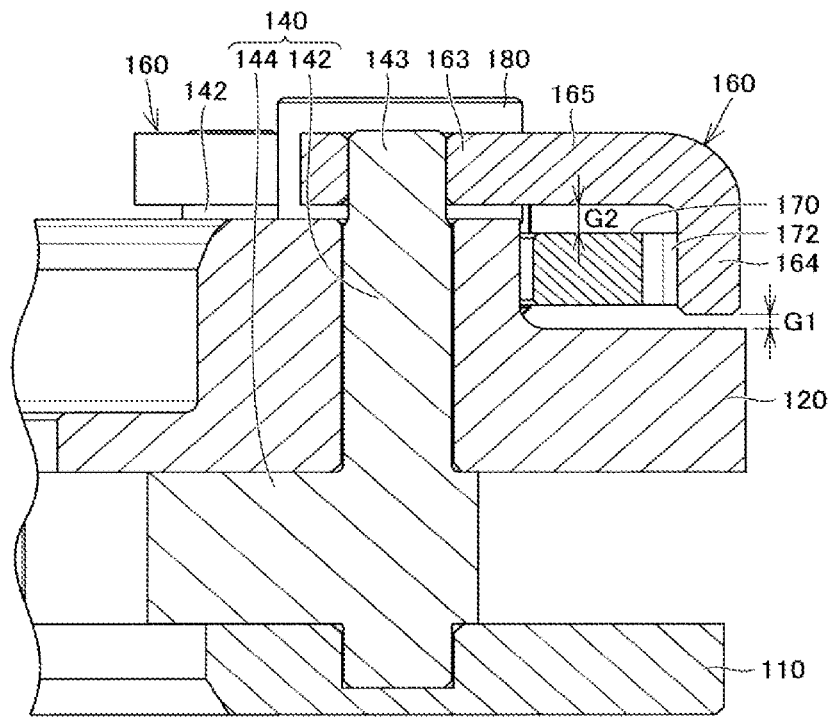
FIG. 5 is a sectional view taken along line V-V in FIG. 4.
Figure 6:
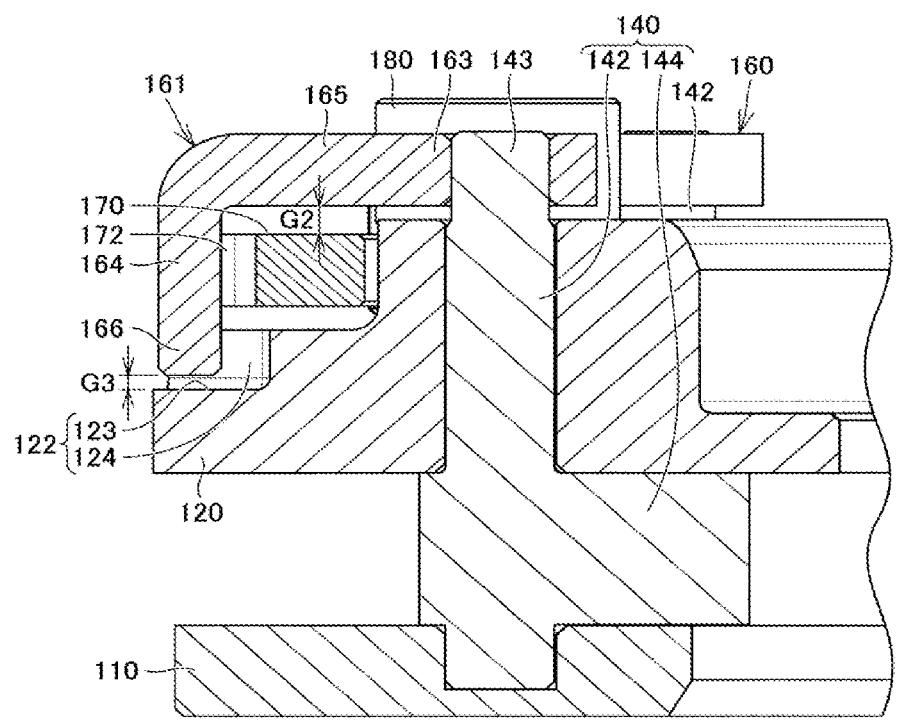
FIG. 6 is a sectional view taken along line VI-VI in FIG. 4.

The variable nozzle unit 100 is disposed within the turbine housing 22. The variable nozzle unit 100 is capable of adjusting the flow passage area of an exhaust air passage of the exhaust gas. FIGS. 2 and 3 are perspective views of the variable nozzle unit illustrated in FIG. 1. FIG. 4 is a plan view of the variable nozzle unit illustrated in FIG. 1. FIG. 5 is a sectional view of the variable nozzle unit taken along line V-V in FIG. 4. FIG. 6 is a sectional view of the variable nozzle unit taken along line VI-VI in FIG. 4. As illustrated in FIGS. 1 to 6, the variable nozzle unit 100 includes a first plate 110, a second plate 120, a plurality of spacers 130, a plurality of nozzle vanes 140, a plurality of vane arms 160, a unison ring 170, and a plurality of sliders 180 (in this embodiment, five sliders).

The first plate 110 has an annular shape. The first plate 110 is disposed in the turbine housing 22 and coaxially with the shaft 30. In this embodiment, as illustrated in FIG. 1, the first plate 110 is provided integrally with a shroud 112. The shroud 112 may be formed separately from the first plate 110.

The second plate 120 has an annular shape. The second plate 120 is disposed at a position that is closer to the bearing housing 32 than the first plate 110 is to the bearing housing 32 and faces the first plate 110. The second plate 120 is disposed in the turbine housing 22 and coaxially with the shaft 30. The second plate 120 cooperates with the first plate 110 to form the exhaust air passage therebetween.

Each of the spacers 130 determines a distance between the first plate 110 and the second plate 120. The spacer 130 is disposed between the first plate 110 and the second plate 120. As illustrated in FIG. 1, in a direction in which the first plate 110 faces the second plate 120, one end and the other end of the spacer 130 are connected to the first plate 110 and the second plate 120, respectively.

Each of the nozzle vanes 140 includes a rotary shaft portion 142 and a vane 144.

The rotary shaft portion 142 is held by the first plate 110 and the second plate 120 such that the rotary shaft portion 142 is rotatable relative to the first plate 110 and the second plate 120. The rotary shaft portions 142 are spaced apart from each other in a circumferential direction of the first plate 110. As illustrated in FIGS. 5 and 6, each rotary shaft portion 142 has a protruding portion 143 that protrudes from the second plate 120 along a direction from the first plate 110 toward the second plate 120 (upward direction in FIGS. 5 and 6).

Each of the vanes 144 is disposed between the first plate 110 and the second plate 120. The vane 144 may change its posture to vary the flow passage area of the exhaust air passage. Specifically, the vane 144 is connected to the corresponding rotary shaft portion 142 such that the vane 144 is rotatable together with the rotary shaft portion 142 around the central axis of the rotary shaft portion 142.

Each of the vane arms 160 is connected (welded, for example) to the corresponding protruding portion 143. The vane arm 160 rotates the corresponding rotary shaft portion 142 around the central axis of the rotary shaft portion 142. As illustrated in FIGS. 2 to 5, the vane arm 160 includes a connecting portion 163, an engaging portion 164, and a coupling portion 165.

The connecting portion 163 is a portion that is connected to the protruding portion 143. The connecting portion 163 has an annular shape that surrounds the protruding portion 143. The connecting portion 163 may be welded to the protruding portion 143, for example.

The engaging portion 164 is a portion that is engaged with the unison ring 170.

The coupling portion 165 is a portion that couples the connecting portion 163 to the engaging portion 164. The coupling portion 165 has a shape that extends outwardly from the connecting portion 163 in a radial direction of the rotary shaft portion 142. The engaging portion 164 is connected to the coupling portion 165 such that the engaging portion 164 extends from the outer end of the coupling portion 165 toward the second plate 120. As illustrated in FIG. 5, a gap G1 is formed between the engaging portion 164 and the second plate 120.

The unison ring 170 is a member that rotates all the vane arms 160 around their respective rotary shaft portions 142 at the same time. The unison ring 170 is held by the second plate 120 such that the unison ring 170 is rotatable relative to the second plate 120 and around the central axis of the second plate 120. The unison ring 170 is disposed between the second plate 120 and the coupling portion 165 in a direction in which the first plate 110 is aligned with the second plate 120. In other words, the coupling portion 165 is disposed outward of the unison ring 170 in a direction in which the second plate 120 and the unison ring 170 are stacked on each other (upper side in FIGS. 5 and 6). As illustrated in FIG. 5, a gap G2 is formed between the coupling portion 165 and the unison ring 170. As illustrated in FIGS. 2 to 4, the unison ring 170 is engaged with the vane arms 160. The unison ring 170 rotates relative to the second plate 120 so that every vane arm 160 and its corresponding rotary shaft portion 142 integrally rotate around the rotation axis of the rotary shaft portion 142. This changes the postures of the vanes 144, thereby varying the flow passage area of the exhaust air passage. Specifically, the unison ring 170 includes a plurality of arm holding portions 172 and a crank lever holding portion 174.

Each of the arm holding portions 172 holds the engaging portion 164 of the corresponding vane arm 160. The arm holding portions 172 are arranged side by side along a circumferential direction of the unison ring 170. Each arm holding portion 172 has a shape that is recessed inwardly from an outer periphery of the unison ring 170 in a radial direction of the unison ring 170. However, the arm holding portion 172 may have a shape that is recessed outwardly from an inner periphery of the unison ring 170 in the radial direction of the unison ring 170.

The crank lever holding portion 174 holds a crank lever (not illustrated) that rotates the unison ring 170 around the central axis of the unison ring 170. The crank lever holding portion 174 is formed in the outer periphery of the unison ring 170 and between adjacent arm holding portions 172. The crank lever holding portion 174 has a shape that is recessed inwardly from the outer periphery of the unison ring 170 in the radial direction of the unison ring 170.

The sliders 180 are connected to the second plate 120 at positions spaced apart from each other and arranged along a circumferential direction of the second plate 120, and each have a shape protruding from the second plate 120 toward the bearing housing 32. Each slider 180 is connected to the second plate 120 at a position where the slider 180 is into contact with the inner periphery of the unison ring 170 and rotatable relative to the second plate 120. During the unison ring 170 rotates, the slider 180 guides the rotation of the unison ring 170 while rotating relative to the second plate 120.

The urging member 200 is a member that urges the variable nozzle unit 100. The urging member 200 includes a first urging portion 210 and a second urging portion 220.

The first urging portion 210 is disposed between the variable nozzle unit 100 and the turbine housing 22. The first urging portion 210 urges the variable nozzle unit 100 against the bearing housing 32 such that the sliders 180 are pressed against the bearing housing 32. The first urging portion 210 is formed of a disc spring.

The second urging portion 220 is disposed between the bearing housing 32 and the sliders 180. The second urging portion 220 is formed of a flat spring. The second urging portion 220 urges the sliders 180 in a direction opposite to the urging direction of the first urging portion 210. The urging force of the second urging portion 220 is smaller than the urging force of the first urging portion 210.

In this embodiment, the plurality of vane arms 160 includes at least one extension arm 161. The extension arm 161 further includes an extension portion 166 in addition to the connecting portion 163, the engaging portion 164, and the coupling portion 165. As illustrated in FIGS. 2, 3, and 6, the extension portion 166 has a shape that extends from the engaging portion 164 toward the second plate 120.

The second plate 120 has a receiving portion 122 that receives the extension portion 166. The receiving portion 122 has a shape that is recessed toward the first plate 110 from a surface of the second plate 120 facing the unison ring 170. In this embodiment, the receiving portion 122 has a shape that opens outwardly in a radial direction of the second plate 120. The receiving portion 122 includes a bottom wall 123 and a pair of contact walls 124.

The bottom wall 123 faces the extension portion 166 in a direction parallel to an axial direction of the rotary shaft portion 142. As illustrated in FIG. 6, a gap G3 is formed between the bottom wall 123 and the extension portion 166.

The pair of contact walls 124 is brought into contact with the extension portion 166, in the circumferential direction of the second plate 120, at a position where each vane 144 maximizes the flow passage area of the exhaust air passage and at a position where the vane 144 minimizes the flow passage area of the exhaust air passage. The contact walls 124 each have a shape extending from an edge of the bottom wall 123, wherein the edges of the bottom wall 123 are arranged in the circumferential direction of the second plate 120. Each contact wall 124 may have a curved shape so as to project toward its companion facing the contact wall 124 in the circumferential direction of the second plate 120.

In this embodiment, the second plate 120 also has a crank lever receiving portion 126 that receives a distal end of the crank lever. The crank lever receiving portion 126 has the same shape as the shape of the receiving portion 122.

As explained above, in the variable nozzle unit 100 of this embodiment, the plurality of vane arms 160 includes the extension arm 161 that includes the extension portion 166, the second plate 120 includes the receiving portion 122, and the extension portion 166 comes into contact with each contact wall 124 of the receiving portion 122, so that the range of the rotation angle of the unison ring 170 is regulated to allow each nozzle vane 140 to rotate between the position where the nozzle vane 140 maximizes the flow passage area of the exhaust air passage and the position where the nozzle vane 140 minimizes the flow passage area of the exhaust air passage. This allows the range of the rotation angle of the unison ring 170 to be regulated by the vane arms 160 and the second plate 120 without the use of a dedicated part for regulating the range of the rotation angle of the unison ring 170 unlike before.

Further, the gap G2 is formed between the coupling portion 165 and the unison ring 170, so that the occurrence of friction between the coupling portion 165 and the unison ring 170 is prevented. This suppresses inclination of each nozzle vane 140 relative to the plates 110, 120.

Further, the gap G1 is formed between the engaging portion 164 and the second plate 120, so that the occurrence of friction between the engaging portion 164 and the second plate 120 is prevented. This suppresses the inclination of each nozzle vane 140 relative to the plates 110, 120 reliably.

Further, the gap G3 is formed between the extension portion 166 and the bottom wall 123 of the receiving portion 122, so that the occurrence of friction between the extension portion 166 and the second plate 120 is prevented. This further suppresses the inclination of each nozzle vane 140 relative to the plates 110, 120 reliably.

Further, the above-mentioned embodiment includes the crank lever receiving portion 126 that has the same shape as the shape of the receiving portion 122, so that the range of the rotation angle of the unison ring 170 can be regulated by the crank lever and the crank lever receiving portion 126, like the extension arm 161 and the receiving portion 122.

It should be considered that the embodiment disclosed herein is merely illustrative and non-restrictive in every respect. The scope of the present invention is defined by the claims rather than the above description, and is intended to include any modifications equivalent in meaning and scope to the claims.

REFERENCE SIGNS LIST 1 turbocharger
10 compressor wheel
12 compressor housing
20 turbine wheel
22 turbine housing
30 shaft
31 bearing
32 bearing housing
100 variable nozzle unit
110 first plate
120 second plate
122 receiving portion
123 bottom wall
124 contact wall
130 spacer
140 nozzle vane
142 rotary shaft portion
143 protruding portion
144 vane
160 vane arm
161 extension arm
163 connecting portion
164 engaging portion
165 coupling portion
166 extension portion
170 unison ring
172 arm holding portion
174 crank lever holding portion
180 slider
200 urging member

The invention claimed is:

1. A variable nozzle unit for adjusting a flow passage area of an exhaust air passage of a turbocharger, the variable nozzle unit comprising:
a first plate having an annular shape;
a second plate having an annular shape and disposed at a position facing the first plate, the second plate cooperating with the first plate to form the exhaust air passage between the first plate and the second plate;
a plurality of nozzle vanes, each of the nozzle vanes having a rotary shaft portion and a vane, the rotary shaft portion being held by the first plate and the second plate such that the rotary shaft portion is rotatable relative to the first plate and the second plate, the rotary shaft portion having a protruding portion that protrudes from the second plate along a direction from the first plate toward the second plate, the vane being disposed between the first plate and the second plate and connected to the rotary shaft portion such that the vane is rotatable together with the rotary shaft portion around a central axis of the rotary shaft portion, the vane being configured to vary the flow passage area of the exhaust air passage;
a plurality of vane arms, each of the vane arms being connected to the protruding portion of the corresponding rotary shaft portion, and configured to rotate the rotary shaft portion around the central axis of the rotary shaft portion; and
a unison ring held by the second plate such that the unison ring is rotatable relative to the second plate and around a central axis of the second plate, the unison ring being configured to rotate the vane arms around the respective rotary shaft portions with rotation of the unison ring relative to the second plate, wherein
the unison ring includes a plurality of arm holding portions, and the arm holding portions are arranged side by side along a circumferential direction of the unison ring and each hold the corresponding vane arm,
each of the vane arms includes an engaging portion that is engaged with the arm holding portion,
the plurality of vane arms includes at least one extension arm,
the extension arm includes an extension portion that has a shape extending from the engaging portion toward the second plate,
the second plate has a receiving portion that receives the extension portion, and
the receiving portion includes a pair of contact walls wherein the contact walls are brought into contact with the extension portion respectively at a position where each of the nozzle vanes maximizes the flow passage area of the exhaust air passage and at a position where the nozzle vane minimizes the flow passage area of the exhaust air passage.

2. The variable nozzle unit according to claim 1, wherein each of the arm holding portions has a shape that is recessed inwardly from an outer periphery of the unison ring in a radial direction of the unison ring,
each of the vane arms further includes:
a connecting portion that is connected to the protruding portion; and
a coupling portion that is disposed outward of the unison ring in a direction in which the second plate and the unison ring are stacked on each other, wherein the coupling portion couples the connecting portion to the engaging portion, and
a gap is formed between the coupling portion and the unison ring.

3. The variable nozzle unit according to claim 1, wherein the engaging portion is located away from the second plate.

* * * * *